(12) United States Patent
Li et al.

(10) Patent No.: US 10,592,048 B2
(45) Date of Patent: Mar. 17, 2020

(54) AUTO-ALIGNER FOR VIRTUAL REALITY DISPLAY

(71) Applicant: Google Inc., Mountain View, CA (US)

(72) Inventors: Chun Yat Frank Li, Mountain View, CA (US); Hayes S. Raffle, Pal Alto, CA (US); Eric Allan MacIntosh, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 34 days.

(21) Appl. No.: 15/585,905

(22) Filed: May 3, 2017

(65) Prior Publication Data

US 2017/0336915 A1    Nov. 23, 2017

Related U.S. Application Data

(60) Provisional application No. 62/337,436, filed on May 17, 2016.

(51) Int. Cl.
*G06F 3/041*       (2006.01)
*G06F 3/038*       (2013.01)
(Continued)

(52) U.S. Cl.
CPC ......... *G06F 3/0418* (2013.01); *G02B 27/017* (2013.01); *G02B 27/2228* (2013.01);
(Continued)

(58) Field of Classification Search
CPC combination set(s) only.
See application file for complete search history.

(56) References Cited

U.S. PATENT DOCUMENTS 5,884,029 A    3/1999   Brush et al.
7,613,569 B2   11/2009  Sherony et al.
(Continued)

FOREIGN PATENT DOCUMENTS

| CN | 102254346 A | 11/2011 |
|---|---|---|
| WO | 2013181026 A1 | 12/2013 |
| WO | 2017/200755 A1 | 11/2017 |

OTHER PUBLICATIONS

Friedman, et al., "Spatial Social Behavior in Second Life", LNCS, vol. 4722, 2007, 12 pages.

(Continued)

*Primary Examiner* — Motilewa Good Johnson
(74) *Attorney, Agent, or Firm* — Brake Hughes Bellermann LLP

(57) ABSTRACT

A method for aligning an image on a mobile device disposed within a head-mounted display (HMD) housing includes: detecting a request to align an image on a touchscreen of a mobile device; detecting, on the touchscreen, a first detected location corresponding to a first touchscreen input event; determining a first displacement of the first detected location with respect to a first target location of the first touchscreen input event; and transposing the image on the touchscreen based on the first displacement. A virtual reality system includes: a mobile device having a touchscreen configured to display an image; and a HMD housing having a first contact configured to generate a first input event at a first location on the touchscreen when the mobile device is disposed within the HMD housing.

22 Claims, 8 Drawing Sheets

(51) Int. Cl.
*G06F 3/0488* (2013.01)
*G02B 27/22* (2018.01)
*G02B 27/01* (2006.01)
*G06T 3/20* (2006.01)
*G09G 5/12* (2006.01)
*G06F 3/044* (2006.01)
*G06F 3/045* (2006.01)
*G06F 1/16* (2006.01)
*G06F 3/01* (2006.01)

(52) U.S. Cl.
CPC ............ *G06F 1/163* (2013.01); *G06F 1/1632* (2013.01); *G06F 3/011* (2013.01); *G06F 3/038* (2013.01); *G06F 3/0488* (2013.01); *G06T 3/20* (2013.01); *G09G 5/12* (2013.01); *G02B 2027/0198* (2013.01); *G06F 3/044* (2013.01); *G06F 3/045* (2013.01); *G09G 2320/0693* (2013.01)

(56) References Cited

U.S. PATENT DOCUMENTS

| | | | | |
|---|---|---|---|---|
| 8,077,153 | B2* | 12/2011 | Benko | G06F 3/0488 345/173 |
| 8,762,043 | B2 | 6/2014 | Eidehall et al. | |
| 8,957,835 | B2* | 2/2015 | Hoellwarth | G02B 27/017 345/8 |
| 9,176,325 | B2* | 11/2015 | Lyons | G02B 27/0172 |
| 9,183,676 | B2 | 11/2015 | McCulloch et al. | |
| 9,274,340 | B2* | 3/2016 | Lyons | G02B 27/0172 |
| 9,323,056 | B2* | 4/2016 | Williams | G02B 27/017 |
| 9,377,626 | B2* | 6/2016 | Lyons | G02B 27/0172 |
| 9,551,873 | B2* | 1/2017 | Zalewski | G06F 3/01 |
| 9,599,824 | B2* | 3/2017 | Lyons | G02B 27/0172 |
| 10,228,773 | B2* | 3/2019 | Lyons | G06F 1/1694 |
| 10,302,951 | B2* | 5/2019 | Lyons | G02B 27/0172 |
| 2004/0254728 | A1 | 12/2004 | Poropat et al. | |
| 2006/0244735 | A1* | 11/2006 | Wilson | G06F 3/0488 345/173 |
| 2007/0200927 | A1* | 8/2007 | Krenik | A61B 3/032 348/47 |
| 2009/0089685 | A1 | 4/2009 | Mordecai et al. | |
| 2010/0005423 | A1 | 1/2010 | Finn et al. | |
| 2010/0091377 | A1* | 4/2010 | Hedges | A42B 3/04 359/630 |
| 2010/0156909 | A1 | 6/2010 | Banerjee et al. | |
| 2011/0248838 | A1 | 10/2011 | Krahenbuhl et al. | |
| 2013/0082963 | A1* | 4/2013 | Chu | G03B 17/08 345/173 |
| 2015/0138645 | A1* | 5/2015 | Yoo | G02B 27/0101 359/630 |
| 2015/0234189 | A1 | 8/2015 | Lyons | |
| 2015/0234193 | A1* | 8/2015 | Lyons | G02B 27/0172 345/174 |
| 2015/0234501 | A1* | 8/2015 | Lyons | G02B 27/0172 345/174 |
| 2016/0018853 | A1 | 1/2016 | Buckley | |
| 2016/0063766 | A1* | 3/2016 | Han | G02B 27/017 345/633 |
| 2016/0239080 | A1* | 8/2016 | Marcolina | G06F 3/011 |
| 2016/0300387 | A1 | 10/2016 | Ziman | |
| 2016/0341953 | A1* | 11/2016 | Tseng | G02B 27/0176 |
| 2017/0011555 | A1* | 1/2017 | Li | G06T 1/60 |
| 2017/0025097 | A1* | 1/2017 | Kuribayashi | G06F 3/147 |
| 2017/0161951 | A1* | 6/2017 | Fix | G09G 5/00 |
| 2018/0130227 | A1* | 5/2018 | Sato | G06T 7/70 |
| 2019/0155405 | A1* | 5/2019 | Lyons | G06F 1/1694 |

OTHER PUBLICATIONS

Metz, "How to Avoid Real Objects While in a Virtual World", MIT Technology Review, Jun. 12, 2015, 8 pages.
Robertson, "The second HTC Vive development kit has a built-in camera and new controllers", retrieved on May 4, 2016 from http://www.theverge.com/2016/1/5/10714522/htcvalvevviveprev2developmentkitces2016, Jan. 5, 2016, 7 pages.
Shanklin, "HTC Vive Pre handson: Chaperone system means less chance of smacking into things", retrieved on May 4, 2016 from http://www.gizmag.com/htcviveprereviewhandson/41182/, Jan. 5, 2016, 8 pages.
Volpe, "HTC's making virtual reality safe for the home with Chaperone", retrieved on May 4, 2016 from http://www.engadget.com/2016/01/05/htcvivevirtualrealitychaperone/, Jan. 5, 2016, 15 pages.
Wilcox, et al., "Personal space in virtual reality", ACM Transactions on Applied Perception (TAP), vol. 3, Issue 4, Oct. 2006, pp. 412-428.
International Search Report and Written Opinion for PCT Patent Application No. PCT/US2017/031036, dated Jul. 28, 2017, 11 pages.

* cited by examiner

AUTO-ALIGNER FOR VIRTUAL REALITY DISPLAY

CROSS-REFERENCE TO RELATED APPLICATION

This application is a Nonprovisional of, and claims priority to, U.S. Provisional Patent Application No. 62/337,436, filed on May 17, 2016, the disclosure of which is incorporated by reference herein in its entirety.

TECHNICAL FIELD

This document relates to graphical user interfaces for computer systems and, in particular, to Virtual Reality (VR) displays for use in VR and related applications.

BACKGROUND

A virtual reality (VR) system can generate a three-dimensional (3D) immersive virtual environment. A user can experience this 3D immersive virtual environment through interaction with various electronic devices, such as, for example, a head-mounted display (HMD) or other VR viewer, gloves fitted with sensors, external handheld devices for additional input and/or output with the VR system, and other such electronic devices. Once immersed in the 3D virtual environment, the user can move through the virtual environment and move to other areas of the virtual environment, through physical movement and/or manipulation of the system's devices to interact with the virtual environment and personalize interaction with the virtual environment.

Some VR systems include a mobile device, such as a smartphone or personal digital assistant (PDA) computing device, disposed within a HMD housing. In such systems, the mobile device provides display and processing of the VR environment, while the HMD housing provides an apparatus for users to attach their mobile devices to their heads. These VR systems can provide a cost-effective way for users to experience VR environments because users can use their existing mobile devices as opposed to obtaining access to dedicated HMD hardware and software.

SUMMARY

In one aspect, a method for aligning an image on a mobile device disposed within a head-mounted display (HMD) housing includes detecting a request to align an image displayed on a touchscreen of a mobile device and detecting, on the touchscreen, a first detected location corresponding to a first touchscreen input event. The method determines a first displacement of the first detected location with respect to a first target location of the first touchscreen input event and transposes the image on the touchscreen based on the first displacement.

According to some implementations, the method can also include comparing the first displacement to a threshold value and when the displacement satisfies the threshold value, the method can generate a notification including instructions for repositioning the mobile device within the HMD housing. In some implementations, the request to align the image is detected responsive to identifying a touch-and-hold input event on the touchscreen. The request to align may also be detected responsive to the mobile device launching an application.

According to some implementations, the method further includes detecting, on the touchscreen, a second detected location corresponding to a second touchscreen input event and determining a second displacement of the second detected location with respect to a second target location of the second touchscreen input event. The method may transpose the image based on the first displacement and the second displacement. In some embodiments, the first touchscreen input event may be generated by a first input button connected to a first conductive contact that is disposed within the HMD housing and the first input button may provide a momentary input. The second touchscreen input event may be generated by a fixed conductive contact that provides continuous input. In some implementations, the second touchscreen input event may be generated by a second input button connected to a second conductive contact that is disposed within the HMD housing and the second input button may provide a momentary input Other embodiments of this aspect include corresponding computer systems, apparatus, and computer programs recorded on one or more computer storage devices, each configured to perform the operations of the method summarized above.

The details of one or more embodiments are set forth in the accompanying drawings and the description below. Other features will be apparent from the description and drawings.

BRIEF DESCRIPTION OF THE DRAWINGS

Like reference symbols in the various drawings indicate like elements.

DETAILED DESCRIPTION

One issue concerning VR systems including a mobile device disposed within a HMD housing is aligning the display of the mobile device with the lenses of the HMD housing. Because the portable device is removable from the HMD housing, it can be difficult to ensure proper alignment. Improper alignment can result in a sub-optimal user experience. For example, the user's perception of the VR environment may not be correct, or the user may experience eye strain, fatigue, nausea, or headaches. Conventionally, users manually align the mobile device within the HMD housing. For example, users may align the mobile device using an alignment marker displayed on the mobile device's display panel and an alignment notch or marker on the HMD housing. But, this approach provides limited alignment because of user error, inherent error in the manual process, shifting of the mobile device during use, or users failing to perform the manual alignment process at all.

Accordingly, the disclosed embodiments describe a method and system for automatically aligning images displayed by a mobile device when the mobile device is disposed within a HMD housing. According to some embodiments, when the mobile device is disposed within the HMD housing, the auto-alignment process may begin responsive to detecting a touch-and-hold touchscreen input event triggered by the user momentarily (e.g., about one second) pressing the HMD housing's input button. The mobile device can determine the displacement between the location of the detected touch-and-hold touchscreen input event and the target location of that event. The software can adjust the images on the display based on the determined displacement. For example, if the location of the detected touch-and-hold touchscreen input event is 0.4 mm to the right of the target location for that event, the mobile device may align the images by transposing them 0.4 mm to the left.

Figure 1:
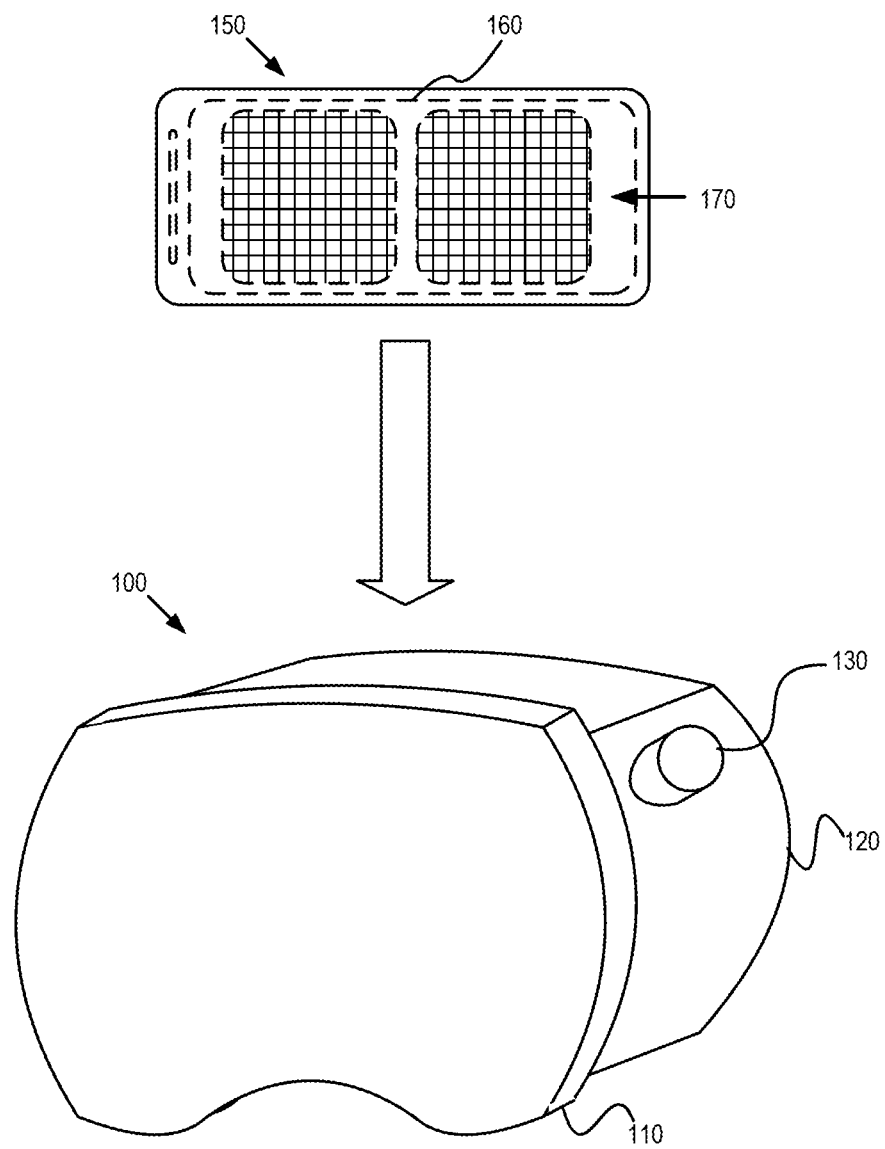
FIG. 1 shows a perspective view of a mobile device and a HMD housing consistent with disclosed embodiments.

FIG. 1 shows a perspective view of HMD housing 100 and mobile device 150. According to some embodiments, mobile device 150 can be placed into HMD housing 102 to create a VR system or a VR viewer. The VR system uses the touchscreen 160 of mobile device 150 to render stereoscopic images, such as alignment image 170. The VR system can also use touchscreen 160 of mobile device 150 to render stereoscopic images representing VR environments. In some embodiments, a user may place mobile device 150 into HMD housing 100 with touchscreen 160 facing rear portion 120 of HMD housing so that when the user places HMD housing 100 in front of the user's eyes, the user can experience the VR environment rendered on touchscreen 160.

According to some embodiments, HMD housing 100 can include front portion 110 and rear portion 120. Front portion 110 and rear portion 120 can separate to allow placement of mobile device 150 within HMD housing 100. For example, front portion 110 can attach to rear portion 120 using a coupling mechanism having a pressure or snap fit or in some embodiments, one or more latches. Before placing mobile device 150 into HMD housing 100, the user may separate front portion 110 and rear portion 120 by moving (e.g., pulling) them apart—thereby disengaging the coupling mechanism (e.g., a pressure fit)—or by opening one or more latches.

In some embodiments, HMD housing 100 can also include input button 130. In some embodiments, input button 130 can trigger touchscreen input events that can be sensed by touchscreen 160 of mobile device 150. For example, in a first-person virtual-reality shooting game input button 130 can be used by the user to trigger the user's weapon. As another example, input button 130 can be used by the user to select one or more objects are user interface elements in a virtual environment rendered by mobile device 150.

Figure 2:
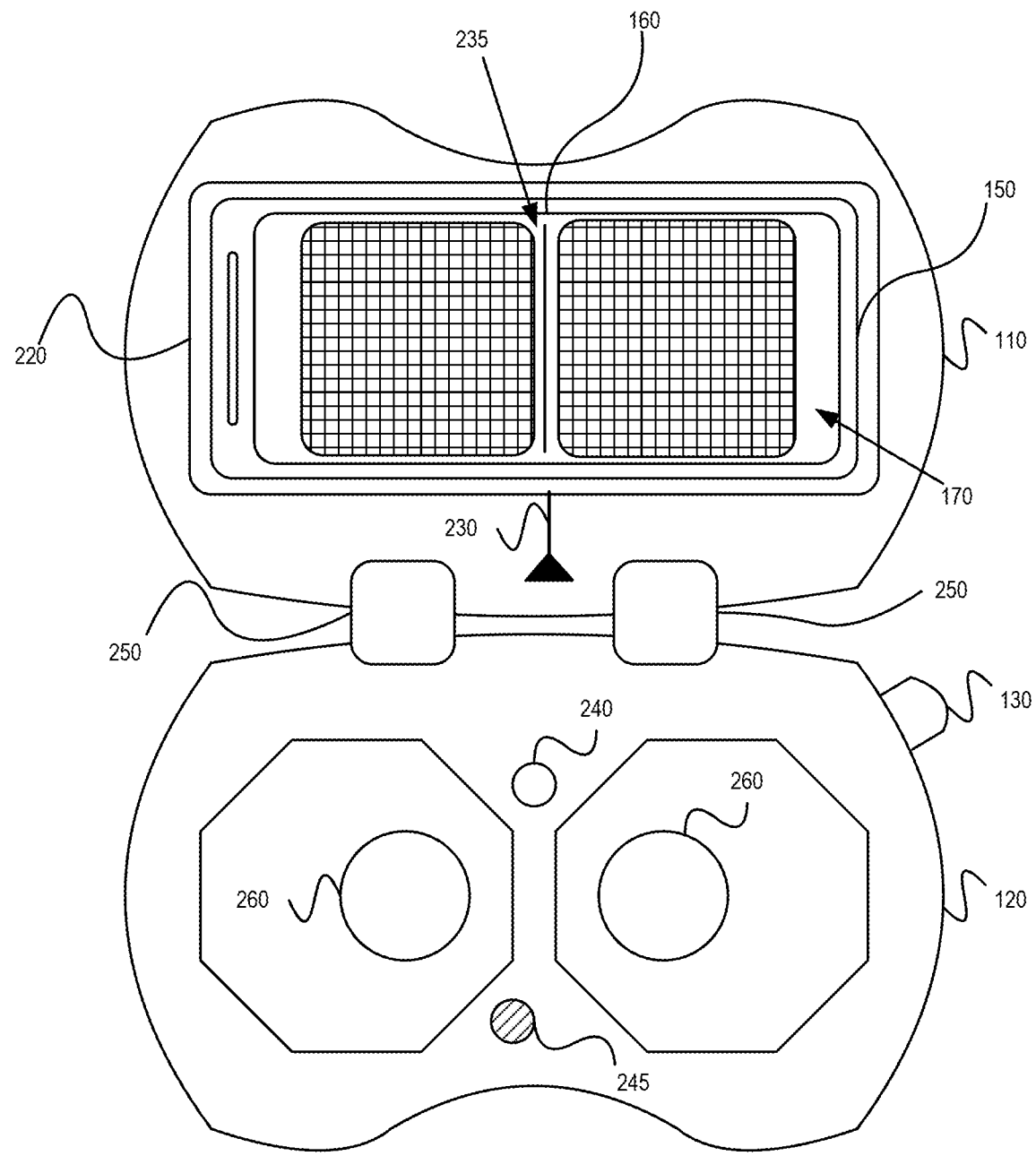
FIG. 2 shows a perspective view of a mobile device and a HMD housing consistent with disclosed embodiments.

FIG. 2 shows a perspective view of HMD housing 100 with mobile device 150 disposed within it. In the perspective view of FIG. 2, front portion 110 and rear portion 120 are attached by hinges 250 and have been separated to facilitate placement of mobile device 150 within cavity 220 of HMD housing 100.

According to some embodiments, when placing mobile device 150 within HMD housing 100, a user can perform a manual alignment process to align mobile device 150 with lenses 260. For example, the user may start an application that renders a VR environment on mobile device 150. When mobile device 150 launches the application, it may display alignment image 170 before processing the code of the application that renders the virtual environment. Alignment image 170 can include alignment indicator 235. The user can manually adjust the placement of mobile device 150 in cavity 220 at a position where alignment indicator 235 lines up with alignment marking 230.

In some embodiments, input button 130 of HMD housing 100 can be connected to conductive contact 240 so that when front portion 110 is engaged with rear portion 120 and input button 130 is depressed, conductive contact 240 engages touchscreen 160. In some embodiments, conductive contact 240 can register a touch event on touchscreen 160. For example, in embodiments where touchscreen 160 is a capacitive touchscreen, when conductive contact 240 engages touchscreen 160, conductive contact 240 can create distortion of the electrostatic field of touchscreen 160 creating a measurable change in capacitance, which the operating system of mobile device 150 may interpret as an input touchscreen event. As another example, embodiments where touchscreen 160 is a resistive touchscreen, conductive contact 240 may supply sufficient force to engage the conductive sheets of touchscreen 160, which the operating system mobile device 150 may interpret as an input touchscreen event.

In some embodiments, user input button 130 can be used to register different types of touchscreen events (e.g., in response to input events having different durations). In some embodiments, when a user taps input button 130 or presses and releases input button 130 quickly (e.g., much less than one second), conductive contact 240 can engage with touchscreen 160 for the same period of time, which the operating system of mobile device 150 may interpret as a tap touchscreen input event. The conductive contact 240 can be a moveable conductive contact arranged to be brought between an extended position and a retracted position, for example by being mechanically actuated via the user input button 130. In the extended position, the moveable conductive contact can engage with the touchscreen 160, for example to generate a touchscreen input event. In the retracted position, the moveable conductive contact can be situated away from the touchscreen 160, for example so that the moveable conductive contact does not then generate a touchscreen input event. For example, when the operating system of mobile device 150 is running the Android platform, the operating system may call the onClick( ) method, or other similar method, for the event listeners registered with the user interface elements displayed at the location where conductive contact 240 engaged touchscreen 160. In some embodiments, when a user presses input button 130 and holds it down for a longer period of time (e.g., about one second or longer), conductive contact 240 can engage touchscreen 160 for the same period of time, which the operating system mobile device 150 may interpret as a touch-and-hold touchscreen input event. For example, when the operating system of mobile device 150 is running the Android platform, the operating system may call the onLongClick( ) method, or other similar method, for the event listeners registered with the user interface elements displayed at the location where conductive contact 240 engage touchscreen 160.

According to some embodiments, HMD housing 100 can also include fixed conductive contact 245. Fixed conductive contact 245 can be constructed of a conductive material capable of creating a distortion of the electrostatic field of touchscreen 160, in embodiments where touchscreen 160 is a capacitive touchscreen. In embodiments were touchscreen 160 is a resistive touchscreen, fixed conductive contact 245 may be of sufficient length to engage the conductive sheets of touchscreen 160 when front portion 110 engages with rear portion 120. For example, when the mobile device 150 is inside the HMD housing 100, the fixed conductive contact 245 can engage the touchscreen 160 whenever the front portion 110 engages with the rear portion 120. In some embodiments, when fixed conductive contact 245 engages touchscreen 160, the operating system of mobile device 150 may interpret the engagement as a touch event that does not have a corresponding release event. For example, in embodiments where the operating system of mobile device 150 is running the Android platform, the operating system may call the onTouch( ) method, or other similar method, for the event listeners registered with the user interface elements displayed at the location where fixed conductive contact 245 engages touchscreen 160.

In some embodiments, HMD housing 100 can be configured with a second input button (not shown) that can control a movable conductive contact at, for example, the position of fixed conductive contact 245 shown in FIG. 2. The second input button and the movable conductive contact may operate in a similar manner as described above with respect to user input button 130 and conduct contact 240.

According to some embodiments, mobile device 150 can include an auto-aligner (such as auto-aligner 565 shown in FIGS. 5A and 5B) that may transpose images mobile device 150 displays on touchscreen 160 based on where the auto-aligner detects conductive contact 240 and/or fixed conductive contact 245. The auto-aligner can detect target locations where conductive contact 240 and/or fixed conductive contact 245 engage touchscreen 160. When conductive contact 240 and/or fixed conductive contact 245 engage touchscreen 160, the auto-aligner may compare the locations of that engagement to the target locations for conductive contact 240 and/or fixed conductive contact 245, and determine a displacement corresponding to any misalignment of touchscreen 160 with lenses 260. The auto-aligner can then transpose images that mobile device 150 displays on touchscreen 160 based on that displacement.

Figure 3:
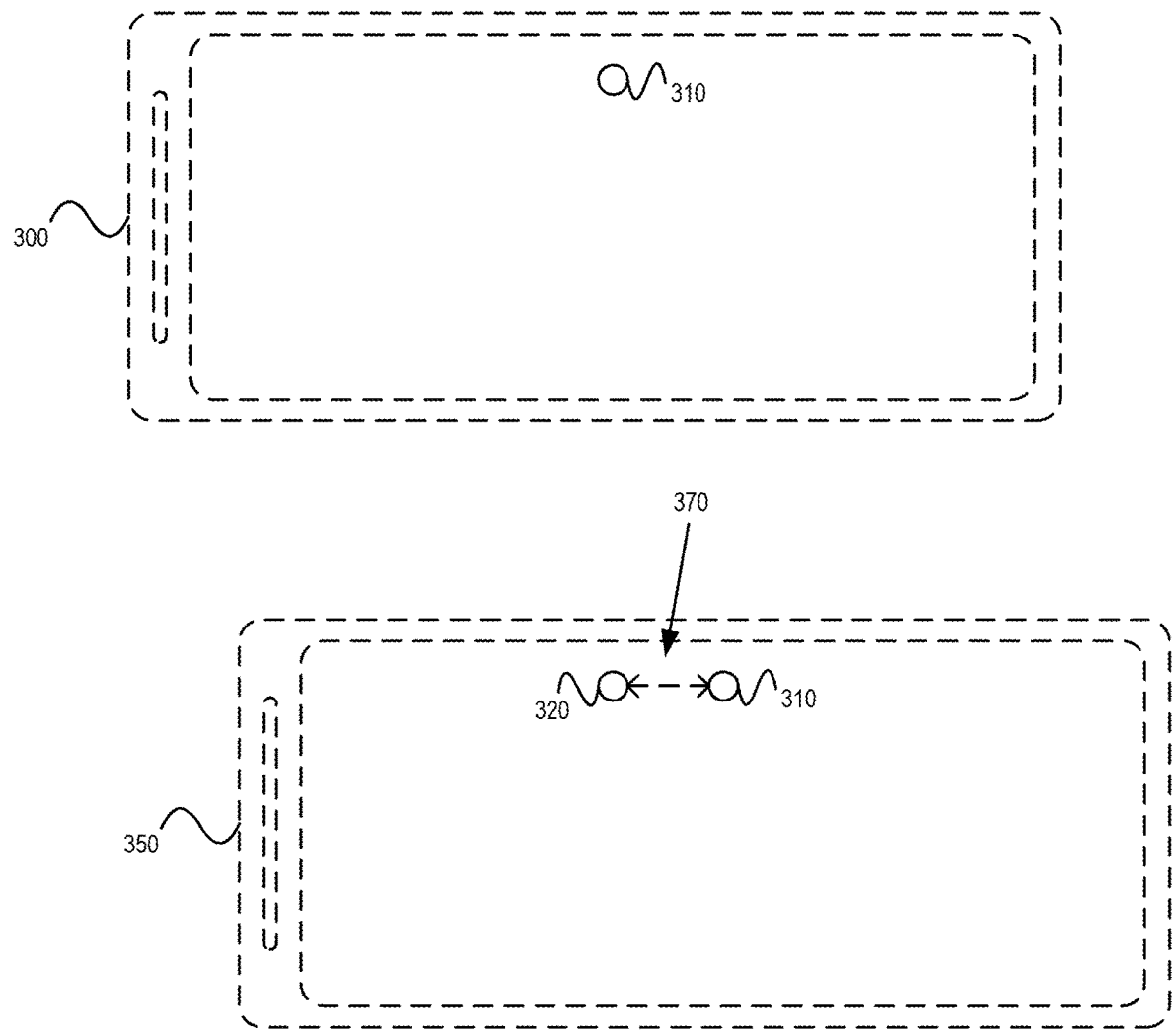
FIG. 3 shows target and detected locations of touchscreen events consistent with disclosed embodiments.

FIG. 3 shows a target location for conductive contact 240 according to some embodiments. FIG. 3 shows mobile device outline 300 representing the outline of an example mobile device 150. FIG. 3 also shows target location 310 for conductive contact 240 relative to mobile device outline 300. Target location 310 represents the point on touchscreen 160 of mobile device 150 where the auto-aligner expects conductive contact 240 to engage touchscreen 160. Mobile device outline 350 represents an outline of an example mobile device 150 that has detected conductive contact 240 engaging touchscreen 160 at detected location 320. Based on the difference between detected location 320 and target location 310, the auto-aligner can determine displacement 370. Auto-aligner can use displacement 372 to transpose images displayed on touchscreen 160 consistent with disclosed embodiments.

Figure 4:
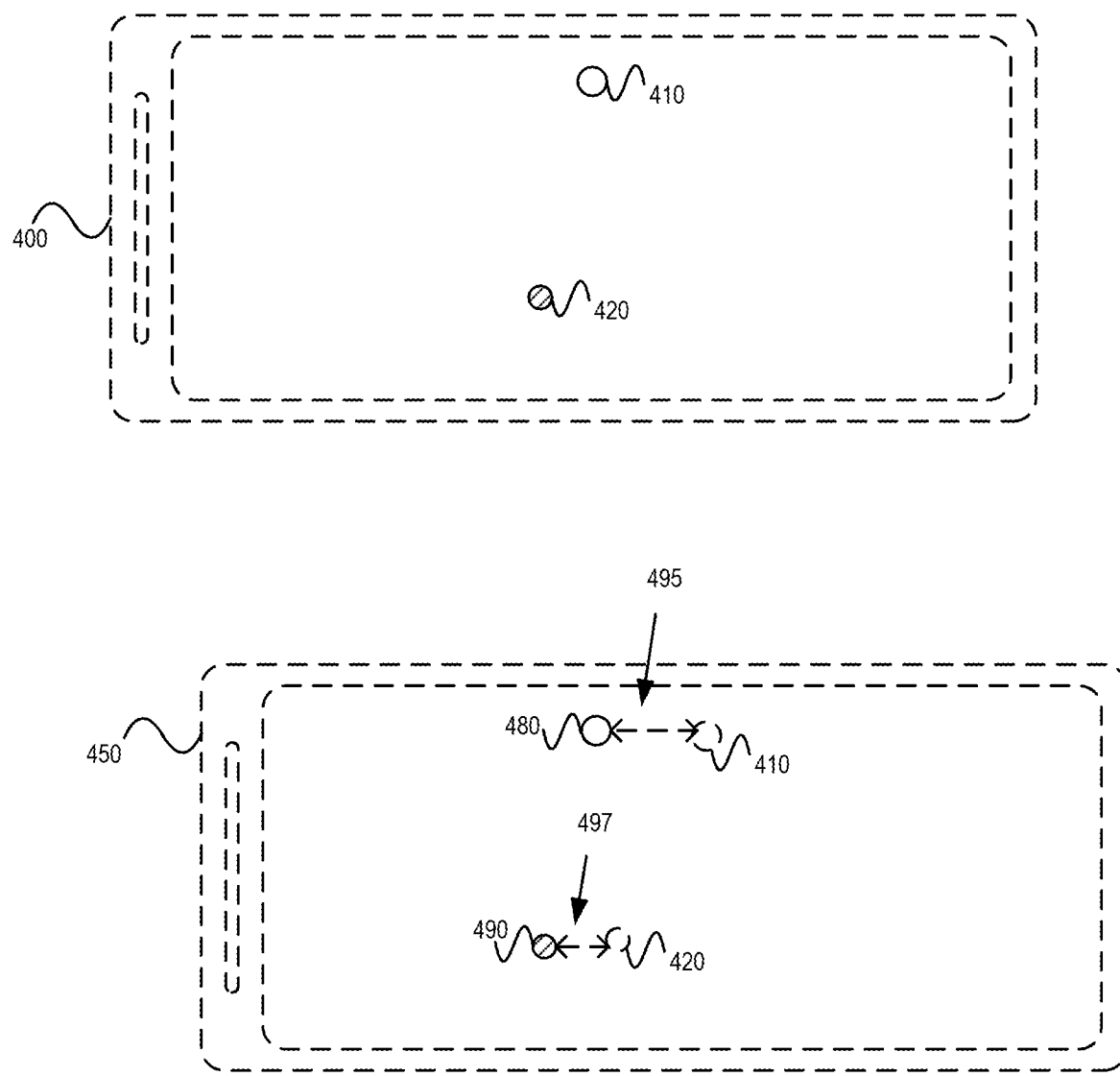
FIG. 4 shows target and detected locations of touchscreen events consistent with disclosed embodiments.

FIG. 4 shows target locations for conductive contact 240 and fixed conductive contact 245 according to some embodiments. FIG. 4 shows mobile device outline 400 representing the outline of an example mobile device 150. FIG. 4 also shows target location 410 for conductive contact 240 and target location 420 of fixed conductive contact 245 relative to mobile device outline 400. Target location 410 represents the point on touchscreen 160 of mobile device 150 where the auto-aligner expects conductive contact 240 to engage touchscreen 160. Target location 420 represents the point on touchscreen 160 of mobile device 150 where the auto-aligner expects fixed conductive contact 245 to engage touchscreen 160. Mobile device outline 450 represents an outline of an example mobile device 150 that has detected conductive contact 240 engaging touchscreen 160 at detected location 480 and has detected fixed conductive contact 245 engaging touchscreen 160 at detected location 490. Based on the difference between detected location 480 and target location 410, the auto-aligner can determine displacement 495. Based on the difference between detected location 490 and target location 420, the auto-aligner can determine displacement 497. Auto-aligner can use displacements 495 and 497 to transpose images displayed on touchscreen 160 consistent with disclosed embodiments.

Figure 5A:
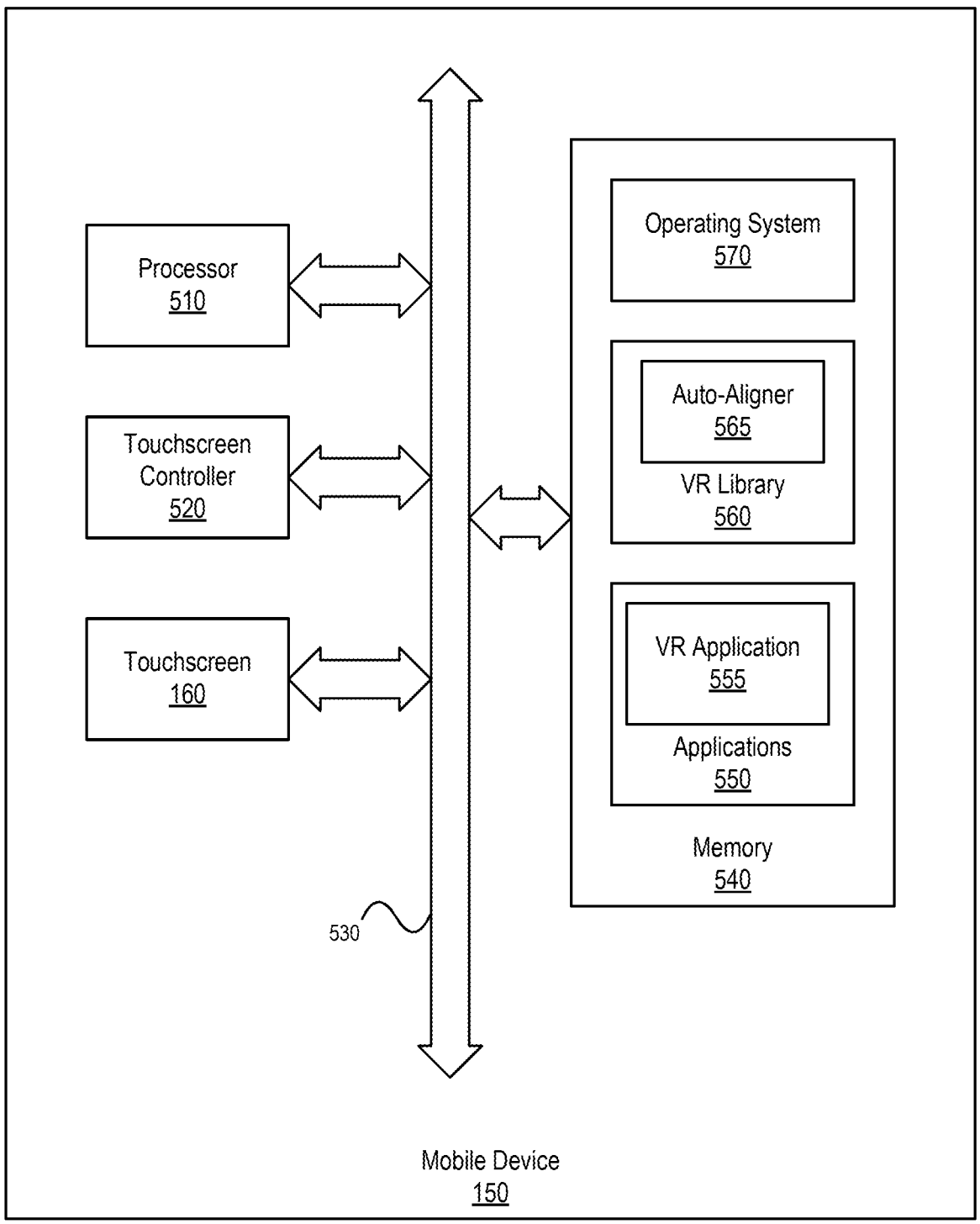
FIG. 5A shows an example block diagram for a mobile device consistent with disclosed embodiments.
Figure 5B:
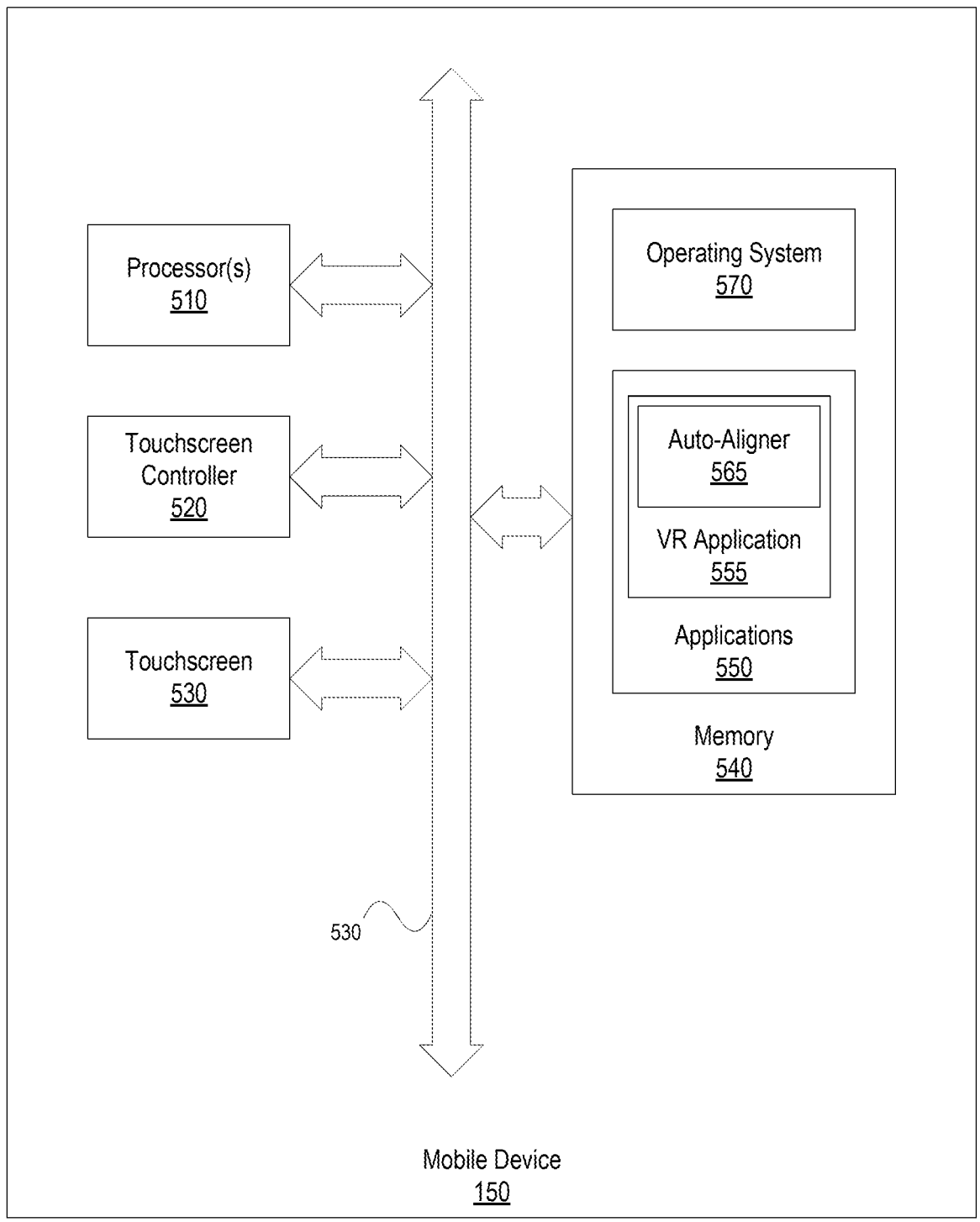
FIG. 5B shows another example block diagram for a mobile device consistent with disclosed embodiments.

FIGS. 5A and 5B show example block diagrams for embodiments of mobile device 150. The block diagrams of FIGS. 5A and 5B show some of the components, in logical form, relevant to a process for aligning images on mobile device 150 when it is disposed within HMD housing 100. While the block diagrams of FIGS. 5A and 5B show some components, in logical form, of mobile device 150, mobile device 150 can include other components in some embodiments, including components that may perform one or more functions related to a process for aligning images on mobile device 150 when it is disposed within HMD housing 100.

As shown in FIG. 5A, mobile device 150 can include processor 510, touchscreen controller 520, touchscreen 160, and memory 540 which can communicate over bus 530, in some embodiments. In some embodiments, processor 510 can access memory 540 to obtain instructions for executing applications 550 and operating system 570. According to some embodiments, applications 550 can include VR application 555. VR application 555 can include instructions that when executed by processor 510 render images for a virtual reality environment on touchscreen 160. For example, VR application 555 can include virtual reality games, applications corresponding to virtual meetings, or applications corresponding to virtual shopping experiences.

According to some embodiments, memory 540 stores instructions representing a VR library 560. VR library 560 can include functions, classes, APIs, or other functional units embodied as software, firmware, or hardware that may provide functionality that may be common to several virtual-reality applications. For example, VR library 560 can provide functionality related to rendering three-dimensional graphics stereoscopic images or detecting location and orientation information of a HMD or HMD housing. In some embodiments, VR library 560 can include auto-aligner 565.

In some embodiments, auto-aligner 565 includes instructions that when executed by processor 510 perform one or more processes for aligning images displayed on mobile device 150 when mobile device 150 is disposed within HMD housing 100. For example, auto-aligner 565 may perform process 600 described below with respect to FIG. 6. In some embodiments, auto-aligner 565 includes event listeners that respond to touch input events on touchscreen 160 that are detected by touchscreen controller 520.

According to some embodiments, auto-aligner 565 can include, access, or store target location information for a plurality of HMD housings. For example, auto-aligner 565 can include target location information for a first HMD housing manufactured by a first manufacturer and target location information for a second HMD housing manufactured by a second manufacturer. In some embodiments, memory 540 can include more than one auto-aligner 565. In such embodiments, each auto-aligner may correspond to a particular HMD housing, and each auto-aligner may perform the functionality of auto-aligner for that particular HMD housing.

In some embodiments, auto-aligner 565 can perform processes to determine the manufacturer or version of HMD housing 100 based on the relative position of the detected locations for conductive contact 240 and fixed conductive contact 245. For example, in a first HMD housing, conductive contact 240 and fixed conductive contact 245 may be 7.5 mm apart and in a second HMD housing, conductive contact 240 and fixed conductive contact 245 may be 45 mm apart. In such an example, auto-aligner 565 can include target location information for both the first and the second HMD housing. When mobile device 150 is placed in the first HMD housing, and conductive contact 240 and fixed conductive contact 245 of the first HMD housing engage touchscreen 160, auto-aligner 565 can determine the distance between them. When auto-aligner 565 determines the distance as approximately 7.5 mm, auto-aligner 565 will apply target location information for the first HMD housing to align images on touchscreen 160. Similarly, when mobile device 150 is placed in the second HMD housing, and conductive contact 240 and fixed conductive contact 245 of the second HMD housing engage touchscreen 160, auto-aligner 565 can determine the distance between them. When auto-aligner 565 determines the distance is approximately 45 mm, auto-aligner 565 will apply target location information for the second HMD housing to align images on touchscreen 160.

According to some embodiments, auto-aligner 565 may not have the target location information for conductive contact 240 and fixed conductive contact 245 for a HMD housing. In such embodiments, auto-aligner 565 can perform a process to obtain the target location information such as communicating with a remote site storing HMD housing specifications for a plurality of versions of HMD housings (e.g., a web site, ftp site, or database managed by the manufacturer of mobile device 150 or operating system 570). For example, when mobile device 150 is placed in HMD housing, and conductive contact 240 and fixed conductive contact 245 engage touchscreen 160, auto-aligner 565 may determine conductive contact 240 and fixed conductive contact 245 are approximately 22 mm apart. If auto-aligner 565 does not contain target location information for a HMD housing where conductive contact 240 and fixed conductive contact 245 are 22 mm apart, auto-aligner 565 may communicate with the remote site and send data describing the distance between conductive contact 240 and fixed conductive contact 245. The remote site may perform, for example, a database lookup using the data it receives from auto-aligner 565, and obtain the target location information for the HMD housing in which mobile device 150 was placed. The remote site may then send the target location information to auto-aligner 565. Using the target location information auto-aligner 565 receives from the remote site, auto-aligner 565 can determine the displacement between the detected locations of conductive contact 240 and fixed conductive contact 245 and use it to transpose images displayed on touchscreen 160, consistent with disclosed embodiments.

In some embodiments, auto-aligner 565 can obtain or determine the target location information for HMD housing 100 without using the detected locations of conductive contact 240 and/or fixed conductive contact 245. In some embodiments, HMD housing 100 may have a QR code attached to it, or a QR code attached to its packaging. The QR code may include the target location information, or may include the location of a remote site where auto-aligner 565 can obtain the target location information for HMD housing 100. In some embodiments, HMD housing 100 may have text, a serial number, a UPC code, or an image, attached to it or to its packaging that may provide auto-aligner 565 with the target location information or where auto-aligner 565 can obtain the target location information, such as a remote site described above. In such embodiments, the text, serial number, UPC code, or image, can be scanned or inputted to mobile device 150 and responsive to such scan or input, auto-aligner 565 can determine or obtain the target location information.

In some embodiments, memory 540 may not include VR library 560. FIG. 5B shows a block diagram of mobile device 150 where memory 540 does not include VR library 560. In such embodiments, auto-aligner 565 may be part of VR application 555. Although the embodiment of mobile device 150 shown in FIG. 5B does not include VR library 560, VR application 555 can include the instructions performing the operations of auto-aligner 565 without departing the spirit and scope of disclosed embodiments.

Figure 6:
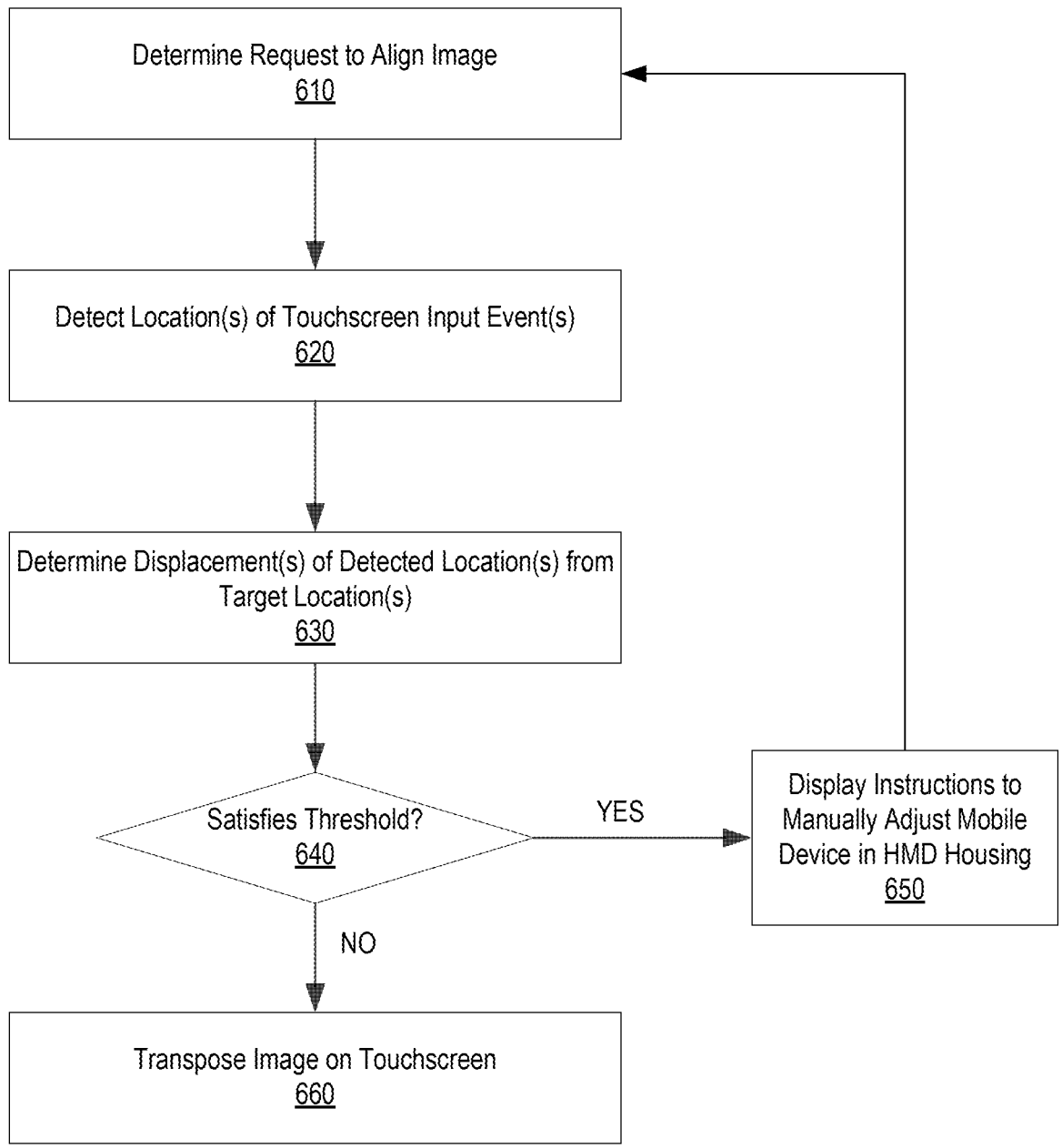
FIG. 6 shows a flow chart for a process for aligning an image on a mobile device disposed within a HMD housing consistent with disclosed embodiments.

FIG. 6 shows a flowchart representing an example process 600 for automatically aligning a VR display. According to some embodiments, auto-aligner component 556 performs the operations and functions of process 600. While FIG. 6 shows the functions of process 600 occurring in a particular order, the order of process 600's operations may vary from embodiment to embodiment. For example, step 650 of process 600 may additionally occur before step 610 of process 600 in some embodiments. Furthermore, in some embodiments, one or more steps of process 600 may be omitted without departing from the spirit and scope of the present disclosure. In addition, while the discussion below describes an auto-aligner (e.g., auto-aligner 565) performing process 600, in other embodiments process 600 can be performed by other components of, or software installed in, a mobile device without departing from the spirit and scope of the present disclosure or limiting the scope of disclosed embodiments. In addition, while in the discussion that follows, certain measurements and values (e.g., 7 mm) have been provided as examples to illustrate the functionality of process 600, these measurements and values are merely examples and not intended to limit the scope of process 600.

Process 600 begins at step 610 where the auto-aligner determines whether there is a request to align the images displayed on a touchscreen of a mobile device disposed within a HMD housing. In some embodiments, the auto-aligner determines the request to align an image when the mobile device launches a virtual-reality application. In such embodiments, the virtual reality application may display instructions for the user to insert the mobile device into the HMD housing by aligning a marking displayed on the touchscreen with a notch or marking on the HMD housing. The instructions may also inform the user to press (tap or touch-and-hold) the input button of the HMD housing once the mobile device is secured within the HMD housing.

In some embodiments, the auto-aligner determines whether there is a request to align images when the mobile device detects a touch event consistent with a fixed conductive contact engaging the touchscreen of the mobile device. For example, the mobile device may detect a touch input event where contact has been made with the touchscreen but not released for a period of time greater than the amount of time associated with a tap touchscreen input event or a touch-and-hold touchscreen input event, such as a touch input event where contact has been made for greater than 5 seconds. When the mobile device detects such a touchscreen input event, the auto-aligner may determine that there is a request to align images on the touchscreen of the mobile device with lenses of an HMD housing in which the mobile device is disposed.

According to some embodiments, a touch-and-hold touchscreen input event at or near the target location of conductive contact 240 may be interpreted by the auto-aligner as a request to align images displayed on the touchscreen of mobile device. For example, after the mobile device is in place in HMD housing and used for some time, such as 5 to 10 minutes, the mobile device may shift inside the HMD housing. As a result, the user may wish to realign the images displayed by the mobile device touchscreen with the lenses of the HMD housing. To do so, in some embodiments, the user may depress the input button of the HMD housing for a period of time consistent with a touch-and-hold touchscreen input event, for example depressing the input button for approximately one second and then releasing. After releasing the input button, the auto-aligner may determine that there has been a request the touchscreen of the mobile device with the lenses of the HMD housing.

After the auto-aligner determines that there has been a request to align the image, the auto-aligner detects the location of touchscreen input events corresponding to a conductive contact associated with the input button of HMD housing and/or a fixed conductive contact of HMD housing (at step 620). In some embodiments, the location information is included with the event data associated with the touchscreen input events corresponding to the conductive contact and/or fixed conductive contact engaging the touchscreen of the mobile device. In such embodiments, the auto-aligner may have event handlers that extract the location data from the events it receives corresponding to the touchscreen input events.

At step 630, the auto-aligner determines the displacement of the locations determined at step 620 from the target locations of touchscreen input events corresponding to the conductive contact and or the fixed conductive contact of the HMD housing. In some embodiments, the auto-aligner may compare the displacement to a threshold value, and if the displacement satisfies the threshold value, for example, it is equal to or greater than the threshold value (step 640: YES), then the auto-aligner may control the mobile device to display instructions on its touchscreen for the user to manually adjust the mobile device within the HMD housing (step 650). For example, the auto-aligner may determine that the displacement between the determined location and the target location is 9 mm and the threshold value may be 5 mm. The auto-aligner may control the mobile device to display instructions that read, for example: "For optimal viewing, please align the mobile device in the HMD housing by aligning the displayed line with the alignment marking on the HMD housing." In some embodiments, the displayed instructions may also include a statement instructing the user to press and hold the input button for a period of time (such as 2 seconds) after manually aligning the mobile device and the HMD housing. When the user does so, the auto-aligner can determine that a request to align images has been made at step 610, and auto-aligner can perform process 600 consistent with disclosed embodiments.

If, however, the displacement determined at step 630 does not satisfy the threshold value, for example, it is less than or equal to the threshold value (step 640: no), the auto-aligner may perform step 660 and transpose the images displayed on the mobile device's touchscreen based on the displacements determined at step 630. For example, if the auto-aligner determines that the displacement is 4 mm to the left, then the auto-aligner may transpose the images on the touchscreen by shifting them 4 mm to the right.

Figure 7:
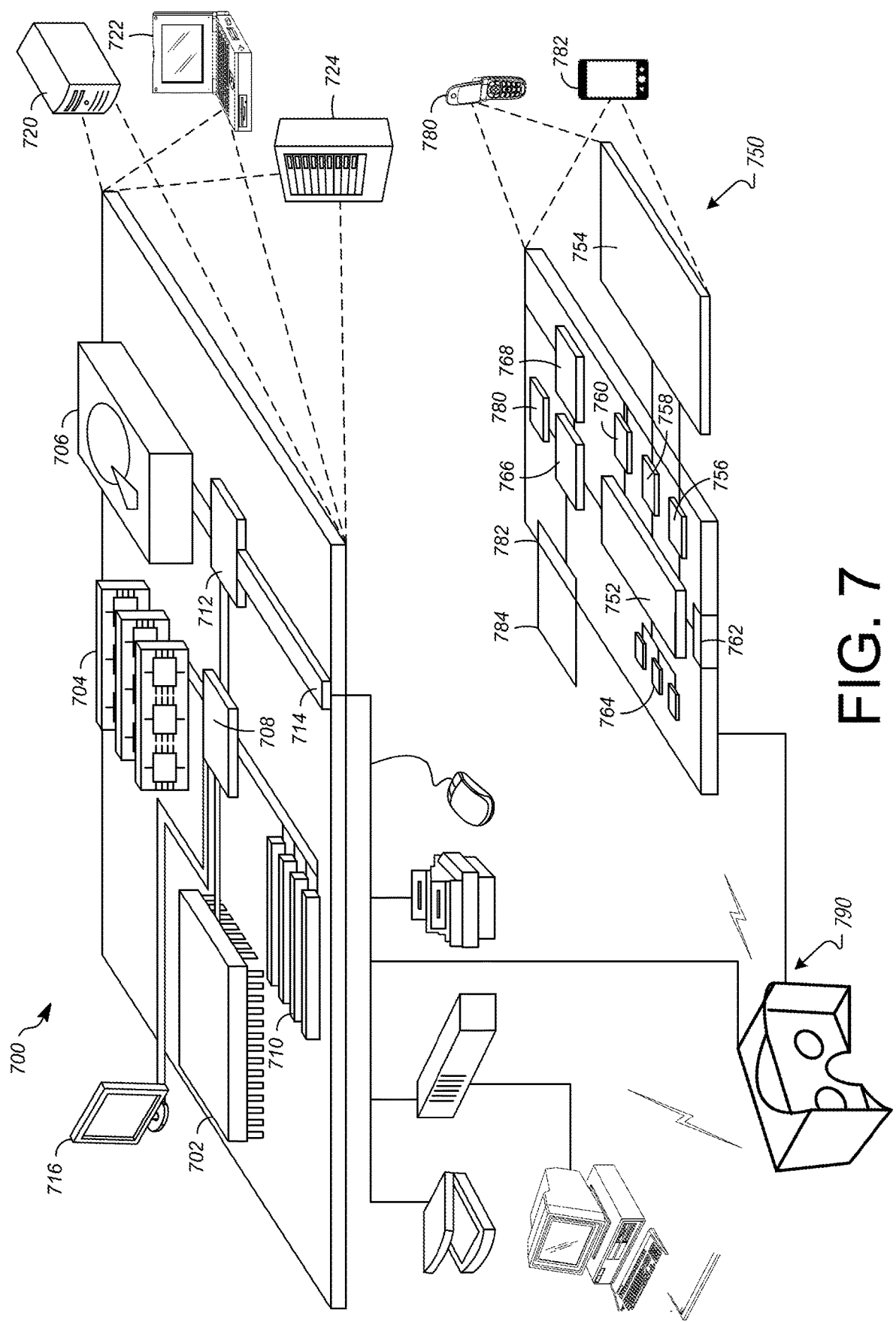
FIG. 7 shows an example of a computer device and a mobile computer device consistent with disclosed embodiments.

FIG. 7 shows an example of a computer device 700 and a mobile computer device 750, which may be used with the described techniques. Computing device 700 can include a processor 702, memory 704, a storage device 706, a high-speed interface 708 connecting to memory 704 and high-speed expansion ports 710, and a low speed interface 712 connecting to low speed bus 714 and storage device 706. Components 702, 704, 706, 708, 710, and 712, are interconnected using various busses, and can be mounted on a common motherboard or in other manners as appropriate. Processor 702 can process instructions for execution within the computing device 700, including instructions stored in the memory 704 or on storage device 706 to display graphical information for a GUI on an external input/output device, such as display 716 coupled to high speed interface 708. In some embodiments, multiple processors and/or multiple buses can be used, as appropriate, along with multiple memories and types of memory. In addition, multiple computing devices 700 can be connected, with each device providing portions of the necessary operations (e.g., as a server bank, a group of blade servers, or a multi-processor system).

Memory 704 stores information within computing device 700. In one embodiment, memory 704 is a volatile memory unit or units. In another embodiment, memory 704 is a non-volatile memory unit or units. Memory 704 may also be another form of computer-readable medium, such as a magnetic or optical disk.

Storage device 706 is capable of providing mass storage for the computing device 700. In one embodiment, storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer- or machine-readable medium, such as memory 704, storage device 706, or memory on processor 702.

High speed controller 708 manages bandwidth-intensive operations for computing device 700, while low speed controller 712 manages lower bandwidth-intensive operations. Such allocation of functions is exemplary only. In one embodiment, high-speed controller 708 is coupled to memory 704, display 716 (e.g., through a graphics processor or accelerator), and to high-speed expansion ports 710, which may accept various expansion cards (not shown). Low-speed controller 712 can be coupled to storage device 706 and low-speed expansion port 714. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

Computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices may contain one or more of computing device 700, 750, and an entire system may be made up of multiple computing devices 700, 750 communicating with each other.

Computing device 750 includes processor 752, memory 764, an input/output device such as display 754, communication interface 766, and transceiver 768, among other components. Device 750 may also be provided with a storage device, such as a microdrive or other device, to provide additional storage. Each of components 750, 752, 764, 754, 766, and 768, are interconnected using various buses, and several of the components may be mounted on a common motherboard or in other manners as appropriate.

Processor 752 can execute instructions within the computing device 750, including instructions stored in memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to display 754. Display 754 may be, for example, a TFT LCD (Thin-Film-Transistor Liquid Crystal Display) or an OLED (Organic Light Emitting Diode) display, or other appropriate display technology. Display interface 756 may comprise appropriate circuitry for driving display 754 to present graphical and other information to a user. Control interface 758 may receive commands from a user and convert them for submission to processor 752. In addition, external interface 762 may communicate with processor 752, so as to enable near area communication of device 750 with other devices. External interface 762 can provide, for example, for wired or wireless communication in some embodiments multiple interfaces can be used.

Memory 764 stores information within computing device 750. Memory 764 can be implemented as one or more of a computer-readable medium or media, a volatile memory unit or units, or a non-volatile memory unit or units. Expansion memory 784 may also be provided and connected to device 750 through expansion interface 782, which may include, for example, a SIMM (Single In Line Memory Module) card interface. Such expansion memory 784 may provide extra storage space for device 750, or may also store applications or other information for device 750. Specifically, expansion memory 784 may include instructions to carry out or supplement the processes described above, and may include secure information also. Thus, for example, expansion memory 784 can be a security module for device 750, and can be programmed with instructions that permit secure use of device 750. In addition, secure applications may be provided via the SIMM cards, along with additional information, such as placing identifying information on the SIMM card in a non-hackable manner.

The memory can include, for example, flash memory and/or NVRAM memory, as discussed below. In one embodiment, a computer program product is tangibly embodied in an information carrier. The computer program product contains instructions that, when executed, perform one or more methods, such as those described above. The information carrier is a computer- or machine-readable medium, such as the memory 764, expansion memory 784, or memory on processor 752 that may be received, for example, over transceiver 768 or external interface 762.

Device 750 can communicate wirelessly through communication interface 766, which can include digital signal processing circuitry where necessary. Communication interface 766 can provide communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 768. In addition, short-range communication can occur, such as using a Bluetooth, Wi-Fi, or other such transceiver (not shown). In addition, GPS (Global Positioning System) receiver module 780 can provide additional navigation- and location-related wireless data to device 750, which can be used as appropriate by applications running on device 750.

Device 750 can also communicate audibly using audio codec 760, which may receive spoken information from a user and convert it to usable digital information. Audio codec 760 may likewise generate audible sounds for a user, such as through a speaker, e.g., in a handset of device 750. Such sound can include sound from voice telephone calls, can include recorded sound (e.g., voice messages, music files, etc.) and can also include sound generated by applications operating on device 750.

Computing device 750 can be implemented in a number of different forms, as shown in the figure. For example, it can be implemented as cellular telephone 780. It can also be implemented as part of smart phone 782, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 7 can include sensors that interface with a virtual reality headset (VR headset/HMD device 790). For example, one or more sensors included on computing device 750 or other computing device depicted in FIG. 7, can provide input to VR headset 790 or in general, provide input to a VR space. The sensors can include, but are not limited to, a touchscreen, accelerometers, gyroscopes, pressure sensors, biometric sensors, temperature sensors, humidity sensors, and ambient light sensors. Computing device 750 can use the sensors to determine an absolute position and/or a detected rotation of the computing device in the VR space that can then be used as input to the VR space. For example, computing device 750 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space.

In some embodiments, one or more input devices included on, or connect to, the computing device 750 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the VR space can cause a particular action to occur in the VR space.

In some embodiments, one or more output devices included on the computing device 750 can provide output and/or feedback to a user of the VR headset 790 in the VR space. The output and feedback can be visual, tactical, or audio. The output and/or feedback can include, but is not limited to, rendering the VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 750 can be placed within VR headset 790 to create a VR system. VR headset 790 can include one or more positioning elements that allow for the placement of computing device 750, such as smart phone 782, in the appropriate position within VR headset 790. In such embodiments, the display of smart phone 782 can render stereoscopic images representing the VR space or virtual environment.

In some embodiments, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the VR space. As just one example, computing device can be a laser pointer. In such an example, computing device 750 appears as a virtual laser pointer in the computer-generated, 3D environment. As the user manipulates computing device 750, the user in the VR space sees movement of the laser pointer. The user receives feedback from interactions with the computing device 750 in the VR environment on the computing device 750 or on the VR headset 790.

In some embodiments, a computing device 750 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit the disclosed embodiments.

A number of embodiments have been described. Nevertheless, it will be understood that various modifications may be made without departing from the spirit and scope of the specification.

Further implementations are summarized in the following examples:

Example 1

A method for aligning an image on a mobile device disposed within a head-mounted display (HMD) housing, the method comprising: detecting a request to align an image on a touchscreen of a mobile device; detecting, on the touchscreen, a first detected location corresponding to a first touchscreen input event; determining a first displacement of the first detected location with respect to a first target location of the first touchscreen input event; and transposing the image on the touchscreen based on the first displacement.

Example 2

The method of example 1, further comprising comparing the first displacement to a threshold value and when the first displacement satisfies the threshold value, generating a notification including instructions for repositioning the mobile device within the HMD housing.

Example 3

The method of example 1 or 2, wherein the request to align the image is detected responsive to identifying a touch-and-hold input event on the touchscreen.

Example 4

The method of example 1 or 2, wherein the request to align the image is detected responsive to the mobile device launching an application.

Example 5

The method of any one of examples 1 to 4, wherein the first touchscreen input event is generated by an input button connected to a conductive contact that is disposed within the HMD housing.

Example 6

The method of example 5, wherein the input button provides a momentary input.

Example 7

The method of any one of examples 1 to 6, further comprising detecting, on the touchscreen, a second detected location corresponding to a second touchscreen input event, determining a second displacement of the second detected location with respect to a second target location of the second touchscreen input event, wherein the image is transposed based on the first displacement and the second displacement.

Example 8

The method of example 7, wherein the second touchscreen input event is generated by a fixed conductive contact that provides continuous input.

Example 9

The method of example 7, wherein the second touchscreen input event is generated by an input button connected to a conductive contact that is disposed within the HMD housing.

Example 10

The method of example 9, wherein the input button provides a momentary input.

Example 11

A virtual reality system comprising: a mobile device having a touchscreen configured to display an image; and a head-mounted display (HMD) housing having a first contact configured to generate a first input event at a first location on the touchscreen when the mobile device is disposed within the HMD housing, wherein the mobile device is configured to determine a first displacement of the first location with respect to a first target location of the first input event, and transpose the image on the touchscreen based on the first displacement.

Example 12

The virtual reality system of example 11, wherein the first contact is a conductive contact.

Example 13

The virtual reality system of example 11 or 12, further comprising an input button on the HMD housing, the input button connected to the first contact.

Example 14

The virtual reality system of any one of examples 11 to 13, wherein the first input event comprises a touch-and-hold input event.

Example 15

The virtual reality system of any one of examples 11 to 14, wherein the HMD housing further has a second contact configured to generate a second input event at a second location on the touchscreen.

Example 16

The virtual reality system of example 15, wherein the mobile device is further configured to determine a second displacement of the second location with respect to a second target location of the second input event, and wherein the image is transposed on the touchscreen based on the first displacement and the second displacement.

Example 17

The virtual reality system of example 15 or 16, wherein the second input event is a continuous input event.

Example 18

The virtual reality system of any one of examples 15 to 17, wherein the second contact is fixed on the HMD housing.

Example 19

The virtual reality system of any one of examples 11 to 18, wherein the touchscreen is a capacitive or resistive touchscreen.

Example 20

A computer program product recorded on a computer storage device, the computer program product including instructions that when executed by a processor cause the processor to perform operations including: detecting a request to align an image on a touchscreen of a mobile device; detecting, on the touchscreen, a first detected location corresponding to a first touchscreen input event; determining a first displacement of the first detected location with respect to a first target location of the first touchscreen input event; and transposing the image on the touchscreen based on the first displacement.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A method for aligning an image on a mobile device disposed within a head-mounted display (HMD) housing, the method comprising:
    detecting a request to align an image on a touchscreen of a mobile device;
    detecting, on the touchscreen, a first detected location corresponding to a first touchscreen input event triggered by a conductive contact positioned at a fixed location on the HMD housing;
    determining a first displacement of the first touchscreen input event with respect to a first target location of the first touchscreen input event, the first target location defined as a point on the touchscreen; and
    transposing the image on the touchscreen based on the first displacement.

2. The method of claim 1, further comprising comparing the first displacement to a threshold value and when the first displacement satisfies the threshold value, generating a notification including instructions for repositioning the mobile device within the HMD housing.

3. The method of claim 1, wherein the request to align the image is detected responsive to identifying a touch-and-hold input event on the touchscreen.

4. The method of claim 1, wherein the request to align the image is detected responsive to the mobile device launching an application.

5. The method of claim 1, wherein the first touchscreen input event is generated by an input button connected to a conductive contact that is disposed within the HMD housing.

6. The method of claim 5, wherein the input button provides a momentary input.

7. The method of claim 1, further comprising detecting, on the touchscreen, a second detected location corresponding to a second touchscreen input event, determining a second displacement of the second detected location with respect to a second target location of the second touchscreen input event, wherein the image is transposed based on the first displacement and the second displacement.

8. The method of claim 7, wherein the second touchscreen input event is generated by a fixed conductive contact that provides continuous input.

9. The method of claim 7, wherein the second touchscreen input event is generated by an input button connected to another conductive contact that is disposed within the HMD housing.

10. The method of claim 9, wherein the input button provides a momentary input.

11. The method of claim 1, wherein the conductive contact is a fixed conductive contact or a moveable conductive contact.

12. The method of claim 1, further comprising:
    determining a manufacturer or version of the HMD housing; and
    accessing, based on the determination, target location information for the HMD housing, the target location information defining the first target location;
    wherein the determination of the first displacement of the first touchscreen input event is performed using at least part of the target location information.

13. The method of claim 12, wherein determining the manufacturer or version of the HMD housing includes determining a separation between the conductive contact and another conductive contact of the HMD housing.

14. A system comprising:
    a mobile device having a touchscreen configured to display an image; and
    a head-mounted display (HMD) housing having a first conductive contact positioned at a fixed location on the HMD housing and configured to generate a first input event at a first location on the touchscreen when the mobile device is disposed within the HMD housing, wherein the mobile device is configured to determine a first displacement of the first input event with respect to a first target location of the first input event, the first target location defined as a point on the touchscreen, and transpose the image on the touchscreen based on the first displacement.

15. The system of claim 14, further comprising an input button on the HMD housing, the input button connected to the first conductive contact.

16. The system of claim 14, wherein the first input event comprises a touch-and-hold input event.

17. The system of claim 14, wherein the HMD housing further has a second contact configured to generate a second input event at a second location on the touchscreen.

18. The system of claim 17, wherein the mobile device is further configured to determine a second displacement of the second location with respect to a second target location of the second input event, and wherein the image is transposed on the touchscreen based on the first displacement and the second displacement.

19. The system of claim 18, wherein the second input event is a continuous input event.

20. The system of claim 17, wherein the second contact is fixed on the HMD housing.

21. The system of claim 14, wherein the touchscreen is a capacitive or resistive touchscreen.

22. A computer program product recorded on a computer storage device, the computer program product including instructions that when executed by a processor cause the processor to perform operations including:
    detecting a request to align an image on a touchscreen of a mobile device disposed within a head-mounted display (HMD) housing;
    detecting, on the touchscreen, a first detected location corresponding to a first touchscreen input event triggered by a conductive contact positioned at a fixed location on the HMD housing;
    determining a first displacement of the first touchscreen input event with respect to a first target location of the first touchscreen input event, the first target location defined as a point on the touchscreen; and
    transposing the image on the touchscreen based on the first displacement.

* * * * *